US008713002B1

(12) United States Patent  
Sahami et al.

(10) Patent No.: US 8,713,002 B1
(45) Date of Patent: Apr. 29, 2014

(54) IDENTIFYING MEDIA CONTENT IN QUERIES

(75) Inventors: Mehran Sahami, Palo Alto, CA (US); Richard C. Gossweiler, III, Sunnyvale, CA (US); Manish G. Patel, Mountain View, CA (US); John Blackburn, Newcastle, WA (US); David A. Brown, Mountain View, CA (US); Neha Gupta, San Jose, CA (US); Thomas H. Taylor, Redmond, WA (US)

(73) Assignee: Google Inc., Mountain View, CA (US)

( * ) Notice: Subject to any disclaimer, the term of this patent is extended or adjusted under 35 U.S.C. 154(b) by 29 days.

(21) Appl. No.: 13/090,139

(22) Filed: Apr. 19, 2011

Related U.S. Application Data

(63) Continuation of application No. 11/742,258, filed on Apr. 30, 2007, now Pat. No. 8,005,826.

(51) Int. Cl.
G06F 7/00 (2006.01)
G06F 17/30 (2006.01)

(52) U.S. Cl.
CPC ...... *G06F 17/30837* (2013.01); *G06F 17/3084* (2013.01)
USPC .......................................... 707/723; 707/737

(58) Field of Classification Search
CPC ..................... G06F 17/30837; G06F 17/3084
USPC ............................ 707/722, 723, 728
See application file for complete search history.

(56) References Cited

U.S. PATENT DOCUMENTS

| 4,963,995 A | 10/1990 | Lang |
| 5,010,499 A | 4/1991 | Yee |
| 5,121,476 A | 6/1992 | Yee |
| 5,589,892 A | 12/1996 | Knee et al. |
| 5,629,733 A | 5/1997 | Youman et al. |
| 5,793,438 A | 8/1998 | Bedard |
| 5,801,787 A | 9/1998 | Schein et al. |
| 5,805,235 A | 9/1998 | Bedard |
| 5,808,694 A | 9/1998 | Usui et al. |
| 5,880,768 A | 3/1999 | Lemmons et al. |
| 5,903,816 A | 5/1999 | Broadwin et al. |
| 5,940,073 A | 8/1999 | Klosterman et al. |
| 6,002,394 A | 12/1999 | Schein et al. |
| 6,005,562 A | 12/1999 | Shiga et al. |
| 6,005,565 A * | 12/1999 | Legall et al. ............... 715/721 |
| 6,014,184 A | 1/2000 | Knee et al. |

(Continued)

FOREIGN PATENT DOCUMENTS

KR 102007-0027143 3/2007

OTHER PUBLICATIONS

Al Zabir, Omar, "Build a Google I G like AJAX Start Page in 7 days using ASP.NET AJAX and .Net 3.0". codeproject.com [online]. [retrieved on May 21, 2010]. Retrieved from the Internet: <URL: http://ww.codeproject.com/KB/ajax/MakingGoogleIG.aspx>, 31 pages.

(Continued)

*Primary Examiner* — Mariela Reyes
(74) *Attorney, Agent, or Firm* — Fish & Richardson P.C.

(57) ABSTRACT

A computer-implemented method includes receiving a query at a central information provider, identifying media-related terms in the query that indicate the query relates to one or more media-related objects, and providing media-specific results in response to the query associated with one or more programs or program staff.

24 Claims, 9 Drawing Sheets

(56) References Cited

U.S. PATENT DOCUMENTS

| | | | |
|---|---|---|---|
| 6,014,502 A | 1/2000 | Moraes | |
| 6,144,958 A | 11/2000 | Ortega et al. | |
| 6,147,715 A | 11/2000 | Yuen et al. | |
| 6,216,264 B1 | 4/2001 | Maze et al. | |
| 6,233,389 B1 | 5/2001 | Barton et al. | |
| 6,263,501 B1 | 7/2001 | Schein et al. | |
| 6,268,849 B1 | 7/2001 | Boyer et al. | |
| 6,373,528 B1 | 4/2002 | Bennington et al. | |
| 6,483,548 B1 | 11/2002 | Allport | |
| 6,493,878 B1 | 12/2002 | Kassatly | |
| 6,505,348 B1 | 1/2003 | Knowles et al. | |
| 6,523,028 B1 | 2/2003 | DiDomizio et al. | |
| 6,640,337 B1 | 10/2003 | Lu | |
| 6,642,939 B1 | 11/2003 | Vallone et al. | |
| 6,769,128 B1 | 7/2004 | Knee et al. | |
| 7,065,709 B2 | 6/2006 | Ellis et al. | |
| 7,328,450 B2 | 2/2008 | Macrae et al. | |
| 7,493,015 B1 | 2/2009 | Van Stam et al. | |
| 7,606,925 B2 | 10/2009 | Sheldon | |
| 7,627,882 B2 | 12/2009 | Finseth et al. | |
| 7,685,619 B1 | 3/2010 | Herz | |
| 7,734,680 B1 | 6/2010 | Kurapati et al. | |
| 2001/0001160 A1 | 5/2001 | Shoff et al. | |
| 2002/0083451 A1 | 6/2002 | Gill et al. | |
| 2002/0133821 A1 | 9/2002 | Shteyn | |
| 2003/0070171 A1 | 4/2003 | Jeon et al. | |
| 2003/0110503 A1 | 6/2003 | Perkes | |
| 2003/0126600 A1 | 7/2003 | Heuvelman | |
| 2003/0226147 A1 | 12/2003 | Richmond et al. | |
| 2004/0073922 A1 | 4/2004 | True | |
| 2004/0078816 A1 | 4/2004 | Johnson | |
| 2004/0088328 A1* | 5/2004 | Cook et al. | 707/104.1 |
| 2004/0194141 A1* | 9/2004 | Sanders | 725/53 |
| 2005/0102704 A1 | 5/2005 | Prokupets et al. | |
| 2006/0064411 A1* | 3/2006 | Gross et al. | 707/3 |
| 2006/0130093 A1 | 6/2006 | Feng et al. | |
| 2006/0136383 A1 | 6/2006 | Golla | |
| 2006/0136683 A1* | 6/2006 | Meyer et al. | 711/154 |
| 2006/0195447 A1 | 8/2006 | Chang | |
| 2006/0230035 A1 | 10/2006 | Bailey et al. | |
| 2007/0214131 A1 | 9/2007 | Cucerzan et al. | |
| 2007/0214480 A1 | 9/2007 | Kamen | |
| 2008/0063381 A1 | 3/2008 | Conroy et al. | |
| 2008/0270449 A1 | 10/2008 | Gossweiler et al. | |
| 2008/0270886 A1 | 10/2008 | Gossweiler et al. | |
| 2008/0271078 A1 | 10/2008 | Gossweiler et al. | |
| 2008/0271080 A1 | 10/2008 | Gossweiler et al. | |
| 2009/0055385 A1 | 2/2009 | Jeon et al. | |

OTHER PUBLICATIONS

International Preliminary Report on Patentability, International Application No. PCT/US2008/062075, dated Nov. 12, 2009, 6 pages.
International Search Report and Written Opinion for International Application No. PCT/US2008/062075, dated Oct. 21, 2008, 10 pages.
Non-Final Office Action from U.S. Appl. No. 11/742,382, dated Jul. 30, 2009, 16 pages.
Final Office Action from U.S. Appl. No. 11/742,382, dated Apr. 15, 2010, 13 pages.
Non-Final Office Action from U.S. Appl. No. 11/742,382, dated Aug. 30, 2010, 19 pages.
Final Office Action from U.S. Appl. No. 11/742,382, dated Feb. 25, 2011, 18 pages.
Sahami, M., et al., "A Web-based Kernel Function for Measuring the Similarity of Short Text Snippets", Proceeding of the 15th International Conference on World Wide Web (WWW 2006), May 23-26, 2006, Edinburgh, Scotland, pp. 377-386.

\* cited by examiner

IDENTIFYING MEDIA CONTENT IN QUERIES

CROSS REFERENCE TO RELATED APPLICATION

This application is a continuation application of, and claims priority to, pending U.S. patent application Ser. No. 11/742,258, filed on Apr. 30, 2007, entitled "Identifying Media Content in Queries". The disclosure of the foregoing application is incorporated herein by reference in its entirety.

TECHNICAL FIELD

This document discusses mechanisms and techniques for identifying terms or other content in a query such as a search request, that indicate that the query is directed toward obtaining media-related information, such as television and movie-related information.

BACKGROUND

It is no secret that the amount of information available online is growing very quickly, that finding information for a user is easy, but that presenting the user with only the information they want or need is very, very difficult. Search engines like the Google search engine work hard to provide results that are more and more relevant to their users.

One area, or vertical, in which people sometimes search for information on line is the media or entertainment industry— mainly television and movies, and more recently, videos such as those provided by YouTube. User's interests when looking for media can differ substantially from those when they are searching for items to purchase (e.g., using the Froogle service). For example, users may simply be interested in determining when episodes of a particular media program will be broadcast. In addition, they may be interested in finding additional programs in which their favorite actor or actress has appeared.

SUMMARY

This document describes mechanisms and techniques that may be employed to identify queries that are directed to finding media-related content. For example, a user may submit the name of a television program such as "lost." The name alone may be completely ambiguous as to whether the user intended to search on the program "lost" or on some other feature related to the word (e.g., orienteering advice). The mechanisms or techniques may look to particular flags, such as a "tv" or "movie" prefix that is published by the search engine and understood by users as a "hard" trigger for a media search. They may also look to the format of the query, apart from particular content, such as by identifying times or time ranges in the query (but without a concern for what the times or time ranges are, at least for classifying the query as media-related). In addition, they may look to whitelists or blacklists of terms, and may also conduct term or concept comparisons such as by using various machine learning mechanisms.

Such techniques may, in certain implementations, provide one or more advantages. For example, they may more readily permit a system to determine that a user wants to see media-related content, so that the system can provide such content, and can also provide structured content in addition to traditional general search results. Providing more relevant, more complete, and better formatted content makes for happier users who return to obtain more information. As a result, entities that advertise with such a search engine may see better results for their advertising, as they may better target their wares to media-interested people.

In one implementation, a computer-implemented method is disclosed. The method includes receiving a query at a central information provider, identifying media-related terms in the query that indicate the query relates to one or more media-related objects, and providing media-specific results in response to the query associated with one or more programs or program staff. Identifying media-related terms in the query can comprise comparing words or word sets in the query to one or more whitelists or blacklists of media-related terms, an can also comprise submitting words or word sets in the query to a machine learning system that has been trained using information known to be media related. Identifying media-related terms in the query can additionally comprise determining a distance between one or more terms and one or more terms in the machine learning system.

In some aspects, providing media-specific results can include providing one or more groupings of program episodes and/or a program guide grid directed to a program episode. The method can also comprise obtaining information for the media-specific search results from a third-party structured database of media content, and from a non-media-directed database. Obtaining the information from the non-media-directed database can also include querying the database with a term descriptive of media, to limit the results from the database to media-related results. In addition, the method can also include identifying time-based terms in the query and providing media-specific results that correspond to the time-based terms, and can include translating the time-based terms from a general time description to a description of a start time and a stop time.

In another implementation, a method for obtaining media-related information is disclosed. The method includes receiving a user request at a central information provider, identifying the request as a media-related request based on the presence in the request of terms that relate to one or more media-related objects, querying, with terms associated with the request, one or more media-specific corpuses that provide media-specific results if the request is determined to be a media-related request, and formatting and transmitting results received from the one or media-specific corpuses for display as search results and as a program guide grid. Identifying the request as a media-related request can comprise comparing words or word sets in the request to one or more whitelists of media-related terms. The search results can be formatted in a plurality of groupings based on media programs. In addition, the method can include identifying time-based terms in the request and providing media-specific results that correspond to the time-based terms.

In yet another implementation, a computer-implemented system is disclosed. The system comprises a request processor to receive and parse search requests from remote devices, and to identify media-related terms in the query, a search engine connected to the request processor to receive queries associated with the search requests, and having access to one or more indeces corresponding to media-related content, and an interface to receive media-related search results from the search engine and format the results for display on the remote devices. The system can also include a page formatter to combine code for creating an electronic program guide grid and the search results for simultaneous display. The page formatter may be programmed to generate a plurality of groupings of search results grouped by media program. Moreover, the request processor can be further configured to identify media-related terms by comparing words or word sets in the query to one or more whitelists or blacklists of media-related terms. And in some aspects, the request processor is further configured to identify media-related terms by submitting words or word sets in the query to a machine learning system that has been trained using information known to be media related.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
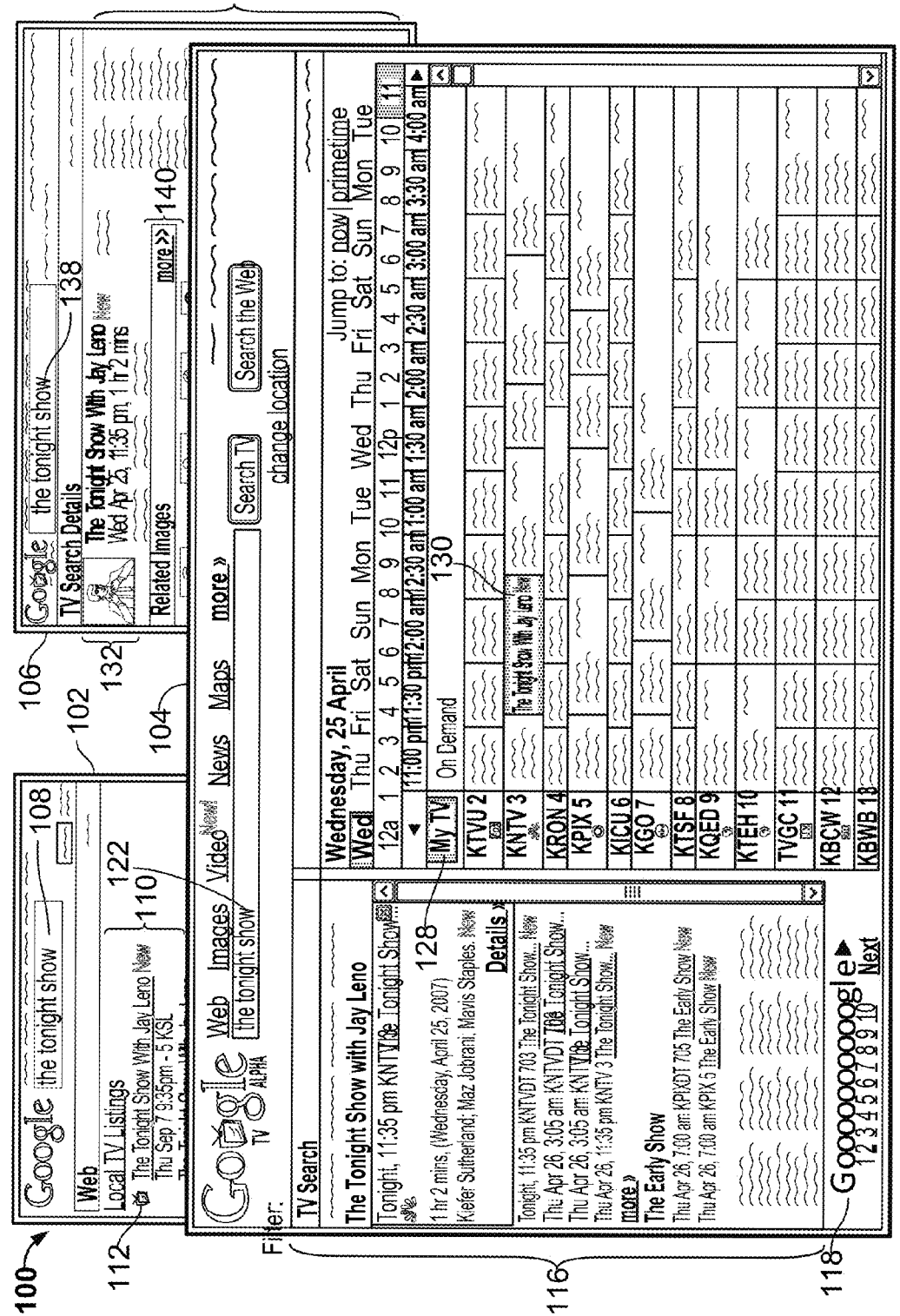
FIG. 1 shows displays illustrating interactions provided by an example program guide system.
Figure 1A:
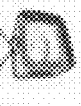
FIGS. 1A-1C show particular displays from FIG. 1.
Figure 1B:
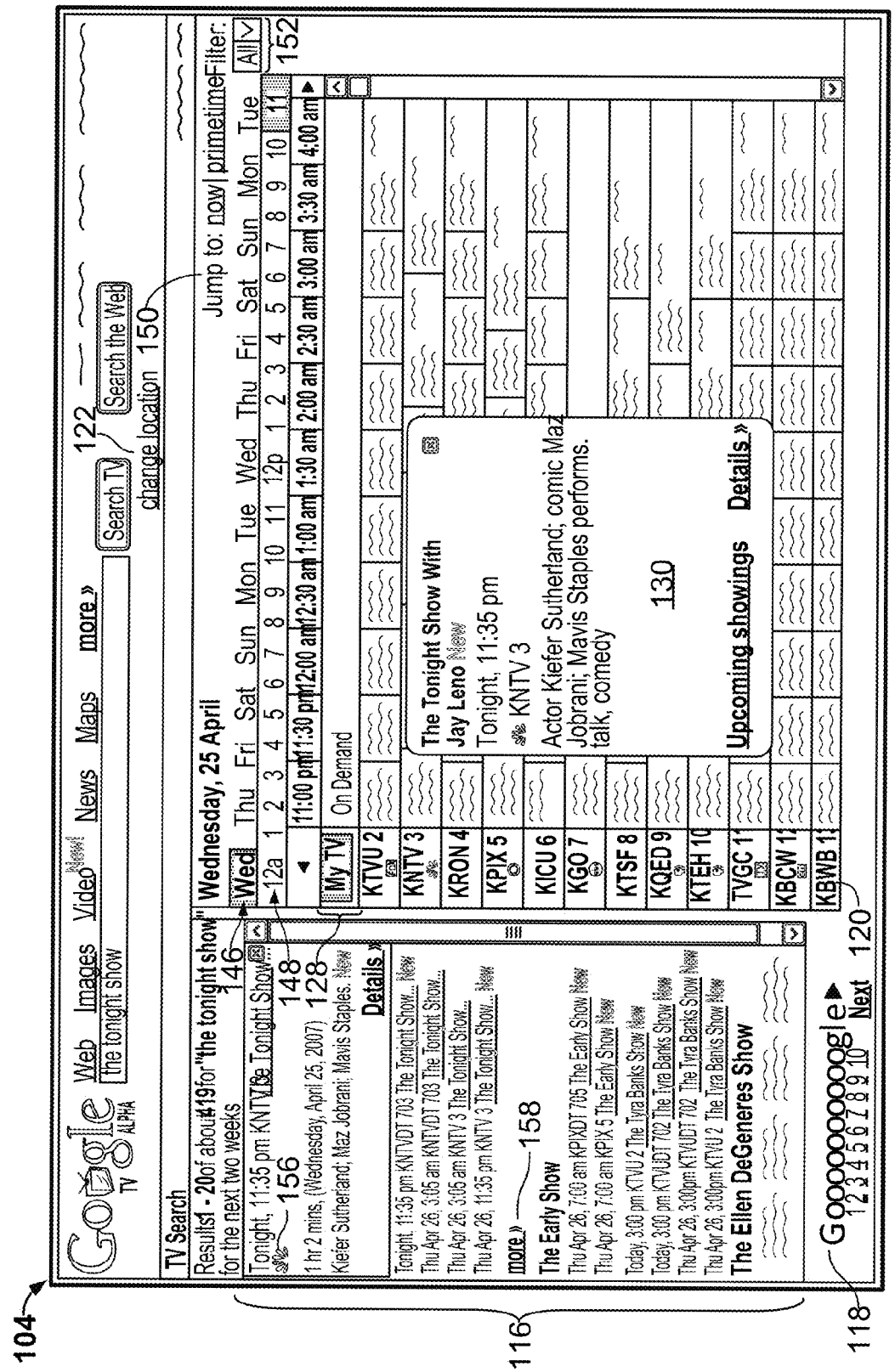
Figure 1C:
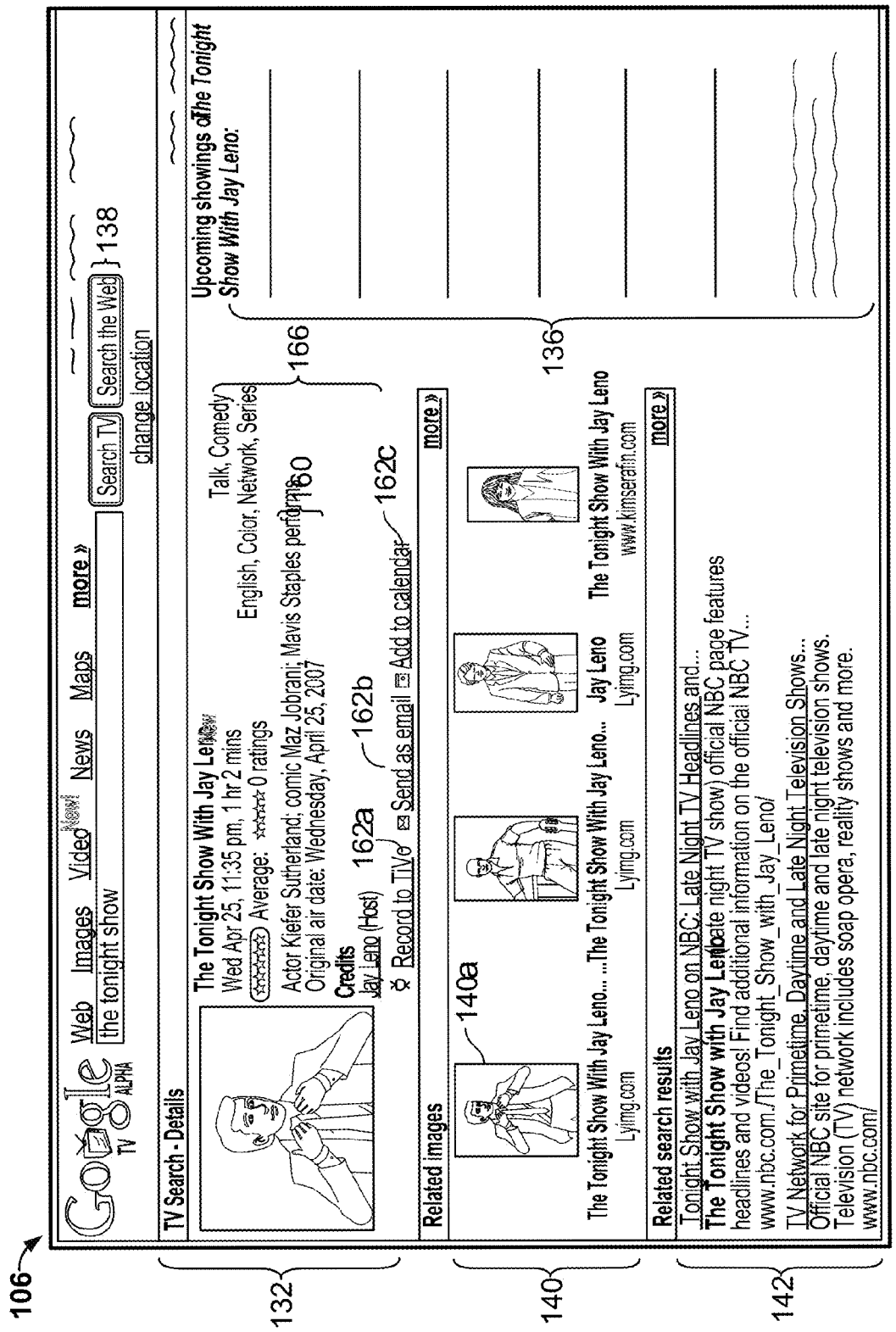

FIG. 1 shows displays illustrating interactions provided by an example program guide system 100, and FIGS. 1A, 1B, and 1C show particular displays from FIG. 1. In general, the program guide system 100 allows a user to search for media programming (e.g., broadcast television, cable television, satellite television, broadcast radio, satellite radio, and Internet media) by making a search request using a search page 102. The program guide system 100 presents, on the search page 102 and/or on a landing page 104, search results that are based on the search request.

The search results include a list of one or more collections of programs related to the search request—grouped by episodes of a program. An episode as used here can include a particular showing in a series of showings (such as an episode of a sitcom), or may include a single episode of a program (such as a movie or a discrete on-line video). The search results also include a program schedule grid 120 that displays a list of channels and program episodes presented by each of the channels for a particular time period. At least one of the program episodes in the schedule grid relates to the search request made by the user. In response to a user selection of a program in the schedule grid or the list, the program guide system 100 presents detailed information associated with the program in a details page 106.

In more detail, the search page 102 includes a search box 108 where a user may input a search term, such as a portion of a television program name. The search page 102 presents preliminary search results based on the search term input. The preliminary search results may include, for example, a list of web pages having information related to the search term. In addition, the preliminary search results may include a list 110 of media programming related to the search term. The media programming list 110 may include text, such as "Local TV Listings," that identifies items in the list 110 as media programming as opposed to web page items. The media programming list 110 also includes one or more media icons 112 that indicate the types of media programming presented in the list 110, e.g., a television, radio, or webcast icon.

Where the system is able to determine that a search request was likely media-related, it can group the media results in a manner that differs from an ordinary list of search results. Specifically, as shown, each of the listings on search page 102 is shown with a title, time, and channel, whereas standard search results may be shown with a title, snippet, and URL. This special formatting of a search result may be referred to as a "one box." Other search results, such as weather, location, and similar results may also be presented in a specially-formatted one box.

The program guide system 100 may present a landing page 104 in response to a user selection of an item in the list 110. The landing page 104 includes media result groupings 116. The groupings 116 list one or more collections of programs related to the search term. The groupings 116 group collections of programs, for example, by program name with each item in a grouping being a particular episode or airing of the program. Alternatively, the groupings 116 may be grouped using another parameter, such as grouping by the media channel presenting the programs, a genre of the programs, or the time of day the programs are presented. An additional results control 118 allows a user to navigate to other groupings that are not currently displayed, and that may be groupings considered to be less responsive to the user's request.

Each of the groupings 116 may also include a "more" control 158 that lists additional results within the particular grouping. In the pictured example, the three next-pending programs are shown for the media grouping associated with the television program "The Tonight Show", and a user can select the "more" control 158 to show addition programs further in the future. Such a selection may cause the Tonight Show grouping to expand and may also cause the other groupings to be removed to make room for the expanded grouping.

The groupings can also include an "Add to my TV" control that, when selected, can add a particular program (such as a series of episodes) or episode to a personalized program guide for the user. For example, a "My TV" channel may be maintained for a user, as described below, and an episode or all the episodes of a program may be added to that channel when the "Add to my TV" control is selected.

The landing page 104 also includes a schedule grid 120. The schedule grid 120 is displayed adjacent to and side-by-side with the groupings 116. The schedule grid 120 presents programming for a particular geographic location. A user may specify or change his or her location by selecting a change location control 122 and by making an input, such as a postal code (e.g., a ZIP code) or city and state names. The selected location may also be used to determine the programs presented in the list 110 and the groupings 116. Where the user is a user registered with the system 100, the user's default location may be used to generate programming suggestions.

The schedule grid 120 presents media programming for a particular time range on a particular date, such as over several hours. A user may select the date using a calendar control 146. The calendar control 146 may default to a particular date, such as the current date. When a search is performed, the grid 120 may default to the area surrounding the time and channel of the episode determined to be a best search result. Selection of other episodes in the groupings 116 may cause the grid to move automatically to display programs around the selected episode (or the first-returned episode for a particular grouping, if a grouping is selected).

The schedule grid 120 presents a list of media channels vertically along its left side and times of day horizontally along its top side in a time bar 148. The programs or episodes for a particular channel are presented in the channel's row and in a column having a time division closest to the actual time that the program is presented by its associated channel. The channels may be associated with a particular numerical channel for a broadcast, or may be a virtual channel such as a personalized channel or a stream of information over the internet.

The schedule grid 120 also includes a personalized channel 128, termed here as "My TV." The personalized channel 128 includes controls that allow a user to create a virtual channel using content from actual channels or another personalized channel, such as the personalized channel of another user. Episodes or programs may be added to the personalized channel 128 in a variety of ways. For example, A user may select a program in the schedule grid 120, and may select a command to move it to the personalized channel 128 or may drag it to the personalized channel, among other things.

Also, one user may send a message to another user that identifies a particular program, such as by supplying a URL to a on line video, supplying an episode ID number, or through another accepted mechanism. In addition, the user may select a control such as the "Add to My TV" control, where that control is associated with a program or episode.

The schedule grid 120 includes the personalized channel 128. The personalized channel 128 is presented near the top of the grid 120 and slightly separated from the other channels to indicate that its programs are specified by the user rather than by a media provider broadcast. The personalized channel 128 can include multiple overlapping programs, and a user may be provided with various mechanisms with regard to watching and managing such programs. As one example, the programs may be displayed initially according to the times they are broadcast or are first made available for download. The user may then drag them later into time so that they do not overlap, so as to "program" a viewing schedule that the user may later follow.

Programs that are shifted in time from their actual broadcast time may be recorded when they are broadcast, such as by a PVR, and may be displayed according to the program the user has established. In this manner, a user can easily select programs to view, see whether the selected programs can be viewed when they are broadcast, and view the programs in a selected order as if they were live programs, but by time-shifting the programs in some selected manner. The personalized channel 128 is described in more detail with respect to FIGS. 4A and 4B below.

A selected program cell 130 may be used to initiate an operation related to the program in other ways also, such as navigating a user to a display that presents more detailed information regarding the program. The details page 106 presents such detailed information. The details page 106 includes a program details area 132. The program details area 132 presents detailed information regarding the program, such as a genre of the program, a runtime length of the program, names of performers in the program, a content rating of the program, a quality rating of the program, and a synopsis of the program.

The program details area 132 also includes an upcoming episodes area 136. The upcoming episodes area 136 presents a list of the upcoming episodes for the program. The list may include detail information such as an episode title, a time for the showing, and a channel on which the showing is to occur.

The details page 106 also includes a search control 138. The search control 138 allows a user to input a search term to initiate a search for a particular program. The search may be limited just to a corpus of information associated with programming, or may be performed on an entire web page corpus, depending on a selection from the user.

The details page 106 also includes an image details area 140. The image details area 140 presents images associated with the program, such as image result 140a. The image result 140a may be found by performing an Internet search for images related to the program, such as would be returned by the standard "Google Images" service. The search may be constrained in particular ways, such as by searching on a particular programming-related corpus of images or by adding certain terms, such as "television" to the query so that "Fred Thompson" returns images of the actor and not of other people. Details including a snippet, image details, and a URL that displays the image, are also provided in image details area 140.

The details page 106 also includes a search details area 142. The search details area 142 may present the results of a search for web pages related to the program, such as a search result 142a. The search details area 142 may simply be a proxy of results that would be shown in response to a standard search for the episode name when applied to a full corpus or a corpus limited to programming related information. Controls may also be provided so that the user can access more episodes, more image results, more search results.

In operation, a user may initiate the program guide system 100 either by inputting a search term, such as "The Tonight Show," for a general web search using the search control 108 or a media programming search using the search control 138. In the case of the search control 108, the program guide system 100 presents the list 110 of programs related to the search term "The Tonight Show" within the search page 102 as part of a one box. Selecting a program in the list 110 directs the user to the landing page 104.

Alternatively, a user may input the search term for "The Tonight Show" using the media programming search control 138, such as is displayed on the landing page 104 or the details page 106. The search input directs the user to the landing page 104.

At the landing page 104, a user may direct the schedule grid 120 to a particular channel, time, and date by selecting a program from the groupings 116. The groupings 116 are programs determined using the search term "The Tonight Show." Each program grouping includes one or more episodes of that particular program. The user may navigate to groupings not currently presented using the additional results control 118. Selecting a particular episode in a program grouping directs the schedule grid 120 to a particular channel, time, and date. The user may also navigate through the schedule grid 120 manually using controls, such as the calendar 146 and the time bar 148. In addition, the user may "drag" the control up, down, left, or right similar in manner to moving a map in Google Maps, and cells in the grid may be added from a queue to be displayed, and additional cells may be fetched or pre-fetched, in the manner of fetching tiles around a display in Google Maps.

Such fetching of tiles may occur by various mechanisms. For example, the system may simply pre-fetch tiles that surround the area currently being displayed (within a certain number of tiles). Also, the fetching may proceed to fill in all channels at a currently displayed time, and then fetching information in the future or in the last direction of time-wise travel in a grid (e.g., if a user's last move was to the right, then future tiles will be fetched). This technique operates under the assumption that people are more likely to surf through channels than to look into the past or future. Under a third technique, the pre-fetching may approximate the momentum of the movement of the grid—much like air over the surface of a moving wing. More material is pre-fetched in the direction of motion (where there can be three dimensions: time, channel, and level of detail). Where motion is particularly fast, more material is fetched in the directed of motion and less to the sides of the grid. As a user's motion slows, more data in other dimensions away from the motion may be pre-fetched.

Regarding a third grid dimension for detail level, such a dimension may be implemented in various manners. In one such implementation, at a least detailed level, a program title and little more may be shown in a grid so as to permit maximum density of tile display. At a more detailed level, a rating and a short description of an episode may be shown. At a yet more detailed level, more detailed description may be shown, and an image may be shown. At a more detailed level, information duplicating or approaching that shown for the detail page 106 may be shown.

The user may navigate to the details page 106 for a particular program by selecting (e.g., clicking or double-clicking on) the program in the schedule grid 120, such as the selected program cell 130. At the details page 106, a user may view detailed information regarding the program in the program details area 132. The detailed information may be obtained, for example, from a structured database that organizes media content according to programs, actors, and other similar parameters and links the information in a relational manner.

The user may view images related to the program in the image details area 140. The images may be obtained from a structure database, such as a database associated with the detailed information, or may be obtained from disparate sources such as in the manner of Google Image Search. The user may navigate to an image by selecting an image result, such as the image result 140a.

The user may navigate to a web page related to the program by selecting a search result, such as the search result 142a, in the search details area 142. The user may also select an image in image details area 140 to have the image associated with the program. For example, the selected image may then be displayed in the details area 132 in place of the prior image, or a portion that is cut out of the image may be displayed in the grid 120, such as in cell 130, so that a user can make particular favorite programs more visible in the grid in a manner that the user can visually associate the cell 130 with the program (e.g., by selecting a logo or title associated with the program).

FIGS. 1A-1C show particular displays from FIG. 1 in more detail. FIG. 1A shows the search page 102. The search page 102 allows a user to search for web content using the search control 108. The program guide system 100 determines that the search term (e.g., "The Tonight Show") may be a media program. For example, if the search term matches a media program name (such as a term stored in a "white list" of media-related terms) or the search term is included in a media program name, then the program guide system 100 may generate and present the list 110 of media programs.

Alternatively, the search term may be another attribute of a media program, such as the program's channel, an actor in the program, or the program's format (e.g., drama or situation comedy). A user may also "force" a media search, such as by preceding a search term with a prefix such as "tv", "tv:", or "television." In addition to a name of a media program, the list 110 presents a time, date, and channel for the media program. The list 110 also indicates whether the particular presentation of the program is new or a repeat. The results in the list 110 may be ordered by relevance to the search term, whether the program presentation is new, and/or the date and time that the program is presented.

The media icon 112 indicates that the list 110 presents media programs. The media icon 112 visually distinguishes the list 110 from general web page search results, such as web page search result 113. The search result 113 is also related to the search term "The Tonight Show." The search result 113 includes a title that identifies the web page, a uniform resource locator (URL) to navigate to the web page, a link to a cached copy of the web page, a link to web pages similar to the web page, and a link to note the web page, such as in a personalized web notebook like Google Notebook. Noting the web page stores information about the web page in a web notebook associated with the user.

FIG. 1B shows the landing page 104 including the media result groupings 116 and the schedule grid 120. The groupings 116 present a list of episodes, grouped by program, matching a particular search term. The matching programs are selected from channels that are available to the user, such as from local broadcast or other media providers. A particular head-end associated with the user may also be associated with the displayed programs.

The location and media providers accessible by the user may be selected using the change location control 122. The change location control 122 will be described in more detail with respect to FIGS. 2A and 2B.

The schedule grid 120 presents the programs matching the search term as well as other programs occurring around the time of the matching program. Selecting a particular instance of a program (e.g., an episode or broadcast) in the media result groupings 116 moves the schedule grid 120 up or down to a channel associated with the program, and left or right to a time associated with the program. This presents the program instance in the schedule grid 120. The schedule grid 120 may immediately present the selected program positioned properly in the grid or may gradually present the program, such as by slowly scrolling to the grid location of the program.

In certain implementations, a user may select a program instance or episode in the schedule grid 120 to generate a new list of programs in the media result groupings 116 related to the selected schedule grid program. In such a situation, the selected program name or another program attribute may be submitted as a programming-directed search request to the system in generating a new landing page 104. For example, if a user selects the cell for "South Park," the grid 120 may re-center on that cell, and the groupings 116 may include programs such as "Beavis & Butthead," (another animated comedy), "The West Wing" (because of the directional reference), and other similar programs.

Programs in the schedule grid 120 that also appear in the groupings 116 are highlighted to indicate that they match the search criteria that generated the groupings 116. The highlighting may be, for example, a shading, color, grid cell size, or cell border thickness that differentiates the schedule grid programs satisfying the search condition from schedule grid programs that do not satisfy the search condition. In certain implementations, the shading, coloring, or sizing varies based on, for example, the closeness of the match between the search term and the program. The shading, coloring, or sizing may also vary with the degree of separation between programs matching the search term and programs related to the matching programs. One manner in which such closeness or separation may be shown is by relative colors of the cells in a grid, similar to the display of a thermal map, with colors ranging steadily from blue (farthest) to red (closest), or another appropriate color scheme.

For example, a user may input a search term such as "Star Trek II: The Wrath of Kahn." Instances or episodes of the movie "Star Trek II: The Wrath of Kahn" in the schedule grid 120 may be highlighted with a first highlighting that is more significant than subsequent highlighting (e.g., a bright color (red for close hits moving to blue for farther hits), dark shading, or large sizing). Instances of Star Trek movies other than "Star Trek II: The Wrath of Kahn" in the schedule grid 120, such as "Star Trek: The Motion Picture," "Star Trek III: The Search for Spock." "Star Trek IV: The Voyage Home," "Star Trek V: The Final Frontier," "Star Trek VI: The Undiscovered Country," "Star Trek: Generations," "Star Trek: First Contact," "Star Trek: Insurrection," and "Star Trek: Nemesis," may be highlighted with a second highlighting that is less significant than the first highlighting. The second highlighting indicates that the associated programs may not match the search term, but they are related to the programs that match the search term (e.g., they are other Star Trek movies).

In addition, episodes of Star Trek series programs, such as "Star Trek: The Original Series," "Star Trek: The Animated Series," "Star Trek: The Next Generation," "Star Trek: Deep Space Nine," "Star Trek: Voyager," and "Star Trek: Enterprise," in the schedule grid 120 may be highlighted using a third highlighting that is less significant than the second highlighting. The third highlighting (e.g., no highlighting at all) indicates that the Star Trek series programs may not match the search term and may not be the same type of media as the programs matching the search term (e.g., movies), but they are related to the programs through the Star Trek genre.

In another example, a user may input a search term for media programs having a particular actor or performer, such as "Leonard Nimoy." Media programs in the schedule grid that include the actor "Leonard Nimoy," such as "Star Trek: The Original Series," are highlighted with a first highlighting. Media programs having actors that have at some time performed with "Leonard Nimoy" are highlighted using a second highlighting. For example, episodes of "T.J. Hooker" and "Boston Legal" may be highlighted using the second highlighting as they include the actor William Shatner who starred with Leonard Nimoy in "Star Trek: The Original Series." However, episodes of "T.J. Hooker" in which Leonard Nimoy guest starred or directed may be highlighted using the first highlighting. The highlighting may also occur by placing images in the cells, so that programs involving Nimoy include a partial photographic portrait of Nimoy, and programs involving Shatner include a partial photographic portrait of Shatner.

In addition to highlighting programs matching the search terms in the schedule grid 120, the groupings 116 may also highlight the programs. The highlighting used in the groupings 116 may match the highlighting used in the schedule grid 120 for corresponding media programs. The groupings 116 may also present the media programs that are related to the media programs matching the search term.

The overall groupings 116 themselves may also be highlighted, such as by including an image associated with each grouping as a watermark behind the grouping. Such an additional feature (not shown) may add decorative interest to the search results, and may also provide additional information to a user. For example, a user may have no idea what the text "Square Pegs" means (e.g., as presented in response to a search for "Freaks and Geeks" or "Square One"), but when shown a background photo that includes Jami Gertz, Tracy Nelson, and Sarah Jessica Parker, they may instantly recognize the iconic Emmy-nominated 1982 program about Weemawee high school.

The schedule grid 120 has an associated calendar control 146. The calendar control 146 includes tabs that allow a user to select a particular date or day of the week. Each tab includes hours of the day associated with the tab. Selecting a time interval in the tab directs the schedule grid 120 to present programs for the selected day and time interval. The calendar control will be described in more detail with respect to FIG. 3.

The schedule grid 120 has a time bar 148 that indicates the times of day that programs in the schedule grid 120 are presented. The time bar 148 includes controls that allow a user to move to an earlier or later time or date. Alternatively, a user may move the schedule grid 120 by another method, such as by clicking on the grid 120 and dragging the grid 120 to a new time or date. The clicking and dragging may also move the grid 120 to present other channels. Alternatively, a user may use a control, such as a scroll bar, to move through the list of channels in the grid 120. As a user moves through times, dates, and channels in the grid 120, the landing page 104 may download data for channels and times/dates outside the periphery of the grid 120. This allows the grid 120 to present the programs for the channels and times that appear as a user moves the grid 120, without having to pause to download them.

The schedule grid 120 has an associated jump control 150 and an associated filter control 152. The jump control 150 allows a user to quickly move to the current time and date in the grid 120 or to a primetime (e.g., 8:00 PM) for the current day. The filter control 152 can be used to filter out various parts of the grid. For example, the filter may be used to show only prime time or late night programming, so that, for example, the grid jumps from 11:00 PM directly to 8:00 PM the next day. Likewise, the filter can be used to show only channels in a particular category, such as only movies channels or sports channels, or channels specifically selected by a user as their "favorites" channels.

The media results groupings 116 provide a compact area to view the results of the media programming search. Particularly, each grouping may present a number of programs that is less than the total number of programs in the grouping. For example, each grouping may represent a media program series and may present up to three episodes from the series. A program identifier 154 identifies the name of the series or grouping. The episodes or instances of the program are represented by schedule entries 156. A "more" control 158 indicates when more episodes or program instances exist that are not shown in the schedule entries 156. The "more" control 158 also indicates how many more entries exist. A user may select the "more" control 158 to present the additional entries. In addition, a user may select the "additional results" control 118 to present additional groupings. The "additional results" control 118 indicates the number of additional pages of media results groupings. A user may select a particular page of media results groupings to be presented in the groupings 116.

When the landing page 104 is resized, for example as a result of a user input, the schedule grid 120 may be resized accordingly. The addition or subtraction of page space may be divided among the cells of the grid 120. The cells of the grid may have minimum and maximum sizes, such that if the minimum or maximum sizes of the cells are reached rows and/or columns may be removed or added, respectively, from the grid 120. The resizing, addition, and subtraction of cells in the grid 120 may be performed by a client-side script in a web browser, such as JavaScript.

Alternatively, or in addition (such as after the cells have reached a minimum size) the cells may be maintained in constant size and the grid 120 may have its channel and time dimensions shrunk or expanded as the window is decreased or increased in size respectively. Thus, for example, as the window is decreased in size, programs may be cut off from the grid in half-hour increments and channel-by-channel with the cell size maintained. In this manner, navigation of the grid 120 may occur in the same way (e.g., dragging of grid cells)

even when the window is shrunk, and there need not be a need for scroll bars in the navigation.

FIG. 1B shows an additional details box 130 that is not shown in the corresponding display in FIG. 1. The details box may be generated, for example, when a user hovers a mouse pointer over a particular cell for a sufficient period of time. The details box may show additional information as provided in the figure, and may also include controls whose selection causes a list of upcoming showings of the program to be displayed, or causes a details page to be displayed.

FIG. 1C shows the details page 106. As previously described, the details page 106 includes the program details area 132, the image details area 140, and the search details area 142. The program details area 132 shows a list 160 of actors associated with the presented program. A user may select an actor in the list 160 to initiate a search of media programming for the selected actor. The search may direct the user to the landing page 104. Alternatively, such a selection may obtain a details page associated with the actor, such as from the iMDB web site. Similar actions may be taken with respect to producers and others who might be associated with a program.

The program details area 132 includes actions 162a-c that may be performed using the program. The program details area 132 also includes information 166 associated with the program, such as an image from the program, the name of the series or program, the name of the episode, a synopsis of the episode, the date and time the program is scheduled for presentation, the channel presenting the program, the format of the program (e.g., a drama series), an indication of whether the program was previously presented or if it is a new episode, ratings information, and accessibility information. The information in the program details area 132 may be retrieved from web sites and services, such as a television/cable/satellite listings service and/or a movie/television information database.

The image details area 140 presents images and image information associated with the program. The images are retrieved by performing a search, for example, of the Internet, images previously retrieved form the internet, or another corpus, such as a structured collection of images, using the search term or other information associated with the program.

The search details area 142 presents web pages and web page information associated with the program. The web pages are retrieved by performing a search, for example, of the internet using the search term or other information associated with the program.

Figure 1D:
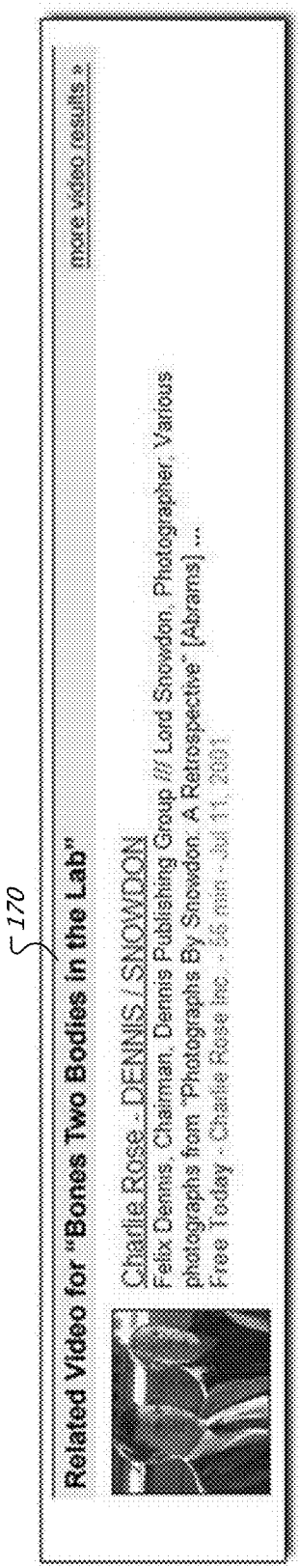
FIG. 1D shows an example portion of a media details page for video results.

In addition, the details page 106 may include a video details area. FIG. 1D shows a video details area 170 that may be included in the details page 106 (but for a different program in this example). The video details area 170 may present a thumbnail image or sample frame or frames (e.g., a short clip) of the video and a link to where the video may be found. The video or videos associated with the program may be retrieved by performing a search, for example, of the internet using the search term or other information associated with the program, or a search of videos at a site such as YouTube. The videos may include videos of other episodes of the program, or may include publicly made videos about the program, among other things.

As one example, keywords may be associated with a program, either manually or by analysis of characteristics of the program and a transcript of the episode. Those keywords may be used to identify matching videos. For example, an episode of JAG may include extensive discussions of aircraft carrier jet landings (as determined from a closed caption script of the program), so that video details area 170 for that episode includes results of videos showing spectacular carrier landings.

A user may select one of the images 140a-d and be directed to a web page where the image may be found. In addition, the user may select one of the web page links 142a-c to be directed to the web page where a reference to the program was found. In certain implementations, the user may input a rating and/or comment for the program. Other users may then view the rating (or a composite rating from multiple users) and/or comment provided by the user. In certain implementations, a user may customize the types of information presented in the details page 106, such as images, web pages, videos, or other media.

Figure 2:
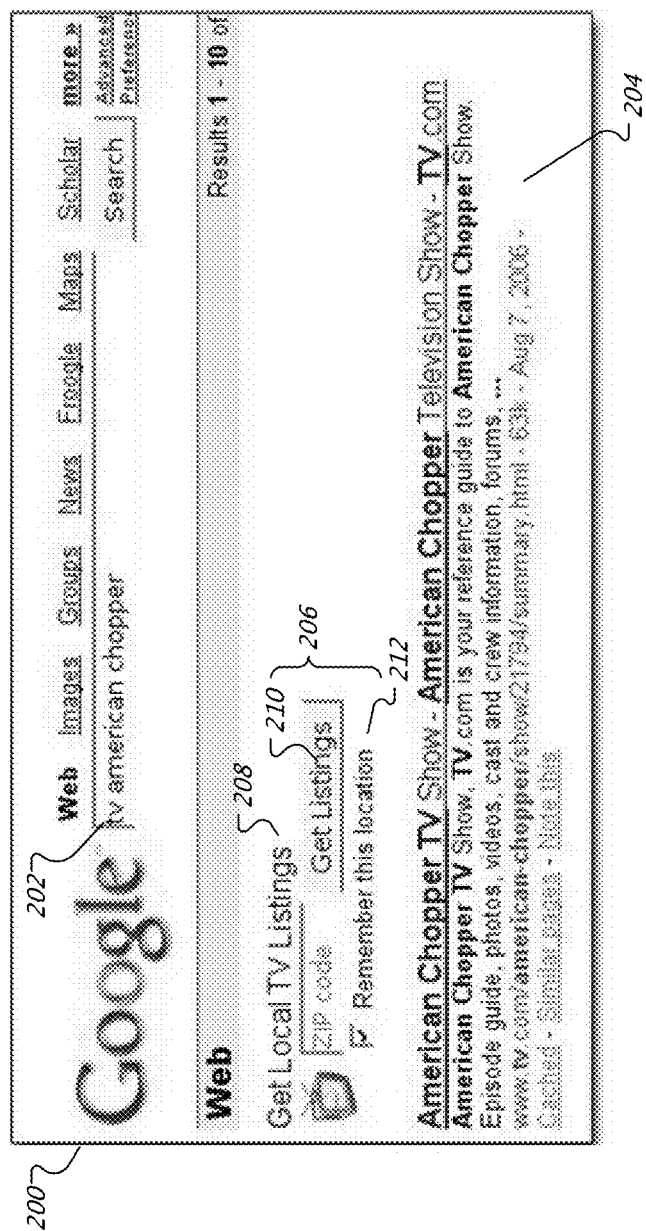
FIG. 2 shows a display for resolving a head end and/or zip-code and/or location of a user.

FIG. 2 shows a display 200 for resolving a head end and/or zip-code and/or location of a user. The display 200 is a web search page. The display 200 includes a search control 202 in which a user may input an Internet search term. A program guide service determines that the search term may be related to a media program. For example, the program guide service may recognize the search term as the name of a program or an episode of a program. Alternatively, the program guide service may recognize a keyword in the search term, such as "television," "TV," or "movie," indicating that the search term may be related to media programming.

In addition to web page search results 204, the program guide service can present media programming information in a media program information area 206. However, in order to determine the media providers, or head ends, accessible to or used by the user, the program guide service may request additional information from the user. The display 200 includes a location identification control 208. In this example, a ZIP code or postal code is requested from the user using the location identification control 208. In another example, other location identification may be used, such as a country, region (e.g., state or province), and/or city. The user may select a "Get Listings" control 210 to retrieve media program information associated with the search term in the search control 202 and available in the location specified in the location identification control 208. The display 200 also includes a "remember this location" control 212. If control 212 is selected, the user's location information may be stored, for example, in a database at a web server or in a cookie at a client device, and used in a subsequent media programming search.

Figure 3:
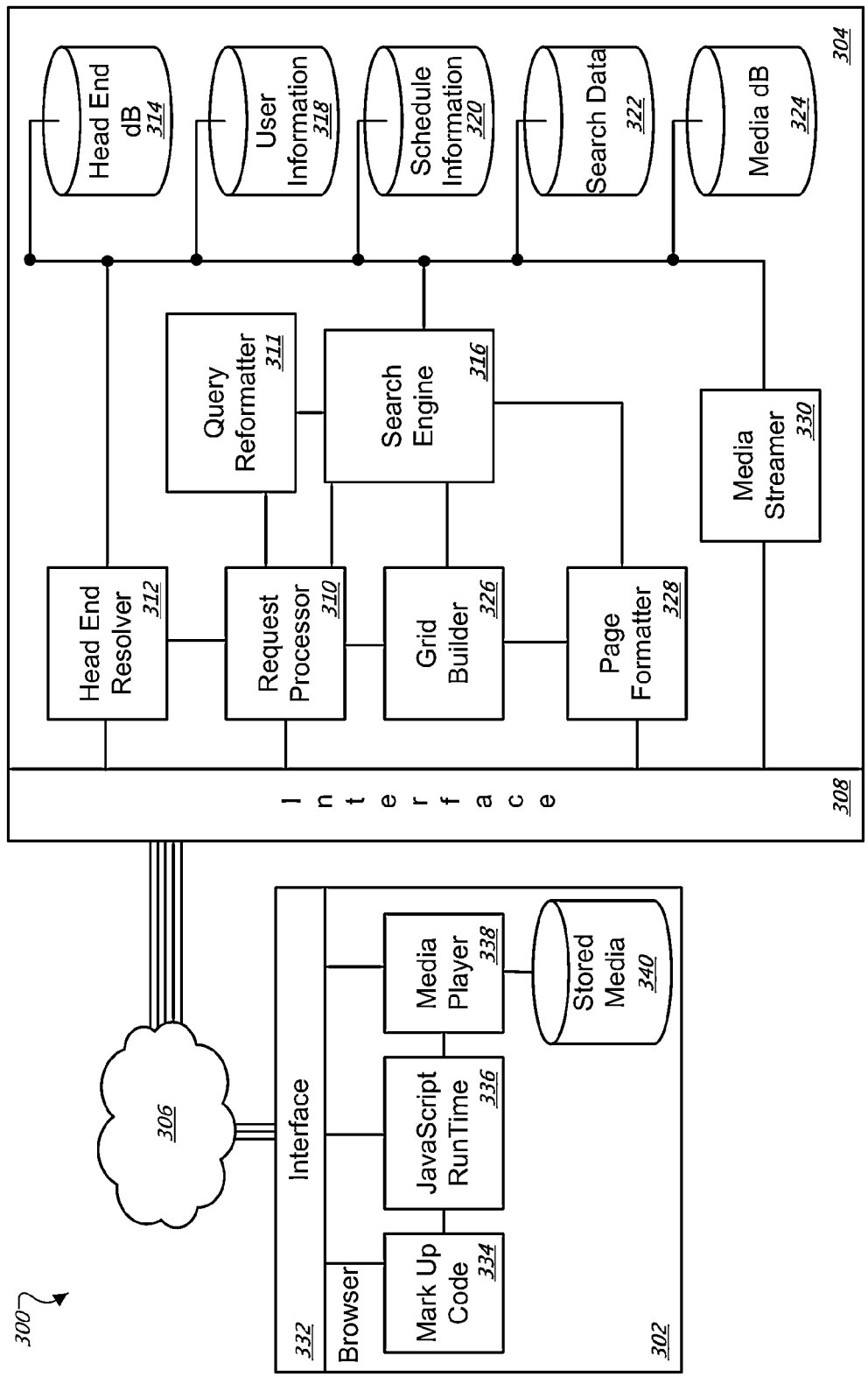
FIG. 3 is a schematic diagram of an example system for accessing media programming.

FIG. 3 is a schematic diagram of an example system 300 for accessing media programming. The system includes a client 302, a server 304, and a network 306 such as the internet connecting the two. The server 304 may communicate through an interface 308, which may itself include one or more web servers. Media-related requests from the client may be identified by the interface and routed to the request processor 310. The request processor may parse the requests into their constituent parts to determine the sort of information requested by the client 302. For example, if the request is a media-related search request, the request processor may pass the search terms to search engine 316, which may return one or more search results in a conventional manner. Also, the search engine 316 may return a media one box, like those described above, where the request is determined to be media related. Additional details about the operation of request processor, in performing parsing, are discussed below with respect to FIG. 4.

Also, if a head end has not been associated with the client 302, a head end resolver 312 may be used to query the user for location information and other information (such as telecom provider) that may help in selecting a head end for the user with information stored in a head end database 314. A head end typically describes a particular source of programming for a user that is unique among various possible sources.

Certain queries might contain identifiers of the user's location, such as if the user entered the query "star trek 60010." The system 300 may recognize 60010 as a zip-code and present the user media-related information based on that location identifier. Certain parts of a query may be recognizable and distinguished from other parts. Certain lists (e.g., whitelists or blacklists) may contain information about certain shows with a zip-code in the title to exclude conflicting or erroneous search results; the show "Beverly Hills 90210," for example, may be listed as a show in which the zip-code term should be excluded from a location identifying attempt.

Additional query processing may be triggered by terms that are present in a white- or blacklist; similarly, terms that are noticeably absent may trigger additional processing. An example of an absent term query might be "Brady 37221" where "bunch" might be the absent term. Together, "Brady bunch" might match media related information on a whitelist, but the query as presented might be one for a relative of the user with the last name Brady and who lives in the 37221 zip-code. The system 300 may prompt the user with a suspected white- or blacklist match with a question such as "Did you mean Brady Bunch 37221?"

In another example, the query "lost" or "lost 80521" may trigger the system to return media-related results, since Lost is a well-known drama series on television and zip-codes are typically five digits. "lost 8 PM" similarly has a characteristic term that hints that the user is interested in media-related results: "8 PM." The system 300 might not return media-related results if the search query was "lost all my money gambling" since there are additional terms in the query that are not recognizable as zip codes, times, etc. The decision of the system 300 to return media-related results may be dependent on the length of the query, among other factors similar to those stated above.

Where a user requests a landing page, grid builder 326 may provide code and generate data for display of a program grid at a particular date and time for a user. The grid builder 326 may receive signals, such as from search engine 316, regarding the position in the grid that is to be displayed on the client 302. Grid information and search information may be provided to a page formatter 328, which may generate code for the display of pages like those shown in FIGS. 1A-1C and 5A-5D. User information 318 may, among other things, indicate a format for the display of a program guide grid, and page formatter 328 may generate code for displaying programming information in the appropriate format, such as the formats shown in FIGS. 5A-5D.

The page formatter 328 may also draw on other sources, such as image search results provided by search engine 316, search data stored in search database 322, and structured media data stored in media database 324. For example, relationships between and among actors and programs may be stored for display on a details page as shown above.

In some implementations, the media database 324 can include a whitelist database that stores queries, words, or word groups that have previously been determined to be media related. The whitelist database can be used to process a query so that it is handled as a media-related query, and a one box or other media-related result like those shown in FIGS. 1A-1C, may be generated and provided to a user. In particular, if the original query (or a portion or variation thereof) is stored in the whitelist, the system may assume, absent indications to the contrary, that the query is media related. Terms in a whitelist may also be weighted according to the strength of connection between the terms and media-related queries. For example, if a system has a set of data regarding a search term, and an understanding of which of the prior searches was media related (e.g., by the user selecting a media-related web site after receiving search results) or related to other subject matter, the weighting can reflect the general confidence that a later query will be media-related. For example, if the system has received 1000 queries for "lost," and 50 percent of the searchers click on a link to a fan site or network web site, while 50 percent went to an outdoors, orienteering, or other web site (such as a site associated with a book named "Lost") the media-related confidence factor for "lost" as a query or part of a query may be set at 0.5.

In determining whether a query is media related, such a score can be compared to scores for other categories. For instance, in the prior example, a term may be considered media-related evidence if its confidence is below 0.5, such as when the confidence for any other category of information is even lower. Of course, if the confidence is low enough, no assumptions of any kind might be made about the searcher's intent, and general search results may be returned, or the user may be prompted to identify which category, of multiple categories, interest them.

Other factors can also be used in addition to a score for a particular word or word set. For example, if multiple words or word sets appear on a media-related whitelist, the confidence that the query is media-related may be increased. Other factors may also be included in an overall confidence score or may act to trump factors that indicate a query is media related. Particular processes for determining whether a query is media related are described in more detail below with respect to FIGS. 4 and 5.

In addition to, or instead of, the use of whitelists and/or blacklists, other mechanisms may be used to determine the media relevance of a particular query. For example, a supervised machine learning system 342 may be trained using log data of past searches, associated with indications of whether the searches were media related or not. The system may use the teaching responses to generate a scoring mechanism or set of rules for determining whether other, future searches are media associated or not. Various mechanisms for such learning may be suitable. Machine learning and/or statistical inference methods such as logistic regression of Bayesian inference may be employed.

In one particular implementation, the machine learning system may employ a finite state automata technique for identifying sub-string matches in submitted queries. The learning system may be trained with information regarding words or word groups that have either a weak or strong relation to each other. Such training may create a map or grid of relationships, whose strength may be expressed, for example, by a normalized score between 0 and 1. When a media-related query is received by the system 300, and parsed by the request processor 310, the reformatter 311 may supply the query or parts of the query to the learning system and receive in response words or word groups determined to have a high degree of correlation to the words or word groups that were submitted from the query. The query reformatted may then add one or more of these words or word groups to the received query before submitting the query to search engine 316.

The learning system can utilize dynamic search results to achieve a high degree of accuracy with respect to the user's search query. In one implementation, the learning system can parse each query term, or groups of query terms, entered by the user, and perform a search on these individual parts. The results of those searches can return a number of returned documents that can be used to create a context vector for the original search query. The context vector can contain many words that tend to occur in context with the original search term(s), and that group of words can be compared with a measure, such as the well-known cosine coefficient, to determine the similarity between the original search query.

The learning system can provide enhanced search results in situations where the search terms have some level of ambiguity. For example, a search term "Miami Vice," (without quotes) applied to simple search engine can return results that include documents that pertain to the city of Miami, Fla., vice squads in general, or the 1980's television drama series. However the same search term applied to the learning system may return documents that contain the phrase "Don Johnson" or "television series" with a high level of occurrence. This may allow the learning system to determine that when the user entered the search term "Miami Vice," they were most likely searching for the documents pertaining to the television series, rather than the documents relating to Miami, Fla. or vice squads in general. The kernel function for providing such robust searching mechanisms is described in Sahami, M., Heilman, T. D. "A web-based kernel function for measuring the similarity of short text snippets." *Proceedings of the 15th International Conference on World Wide Web* (WWW 2006), pp. 377-386, which is incorporated in its entirety herein by reference.

In other embodiments, search queries can be matched to whitelists. A whitelist matcher can employ state automata to allow for efficient substring matching in a user's query to determine if it contains whitelist or blacklist terms. Such a mechanism is advantageous in that it allows very efficient checking of queries against white- or blacklist terms. Such a mechanism is advantageous in that it allows very efficient checking of queries against white- or blacklist terms that may be indicative of media-related searches or not.

Various databases may also be accessed by system 300. For example, user information database 318 may contain personalized information about users. Such information may include, for example, favorite channels of the user, the content of the user's personalized channel and other information that may be used to generate custom displays like those shown in FIGS. 1A-C. The data may be accessed, for example, in response to requests form JavaScript running on the client, and may be supplied via XML or other format for use in an asynchronous fashion. Also, schedule information 320 may be provided, such as to grid builder 326 for display of programming information.

Media streamer 330 may be used where streamlining media is provided by the system 300. The media streamer 330 may take any appropriate form and may be triggered based upon a display request from the client 302 when a particular program is set for display on the client 302. As shown in FIG. 3, interface 332 connects network 306 to browser 302. Browser 302 includes a mark up code component 334, a JavaScript runtime component 336, and a media player component 338. The media player component 338 accesses stored media 340.

Figure 4:
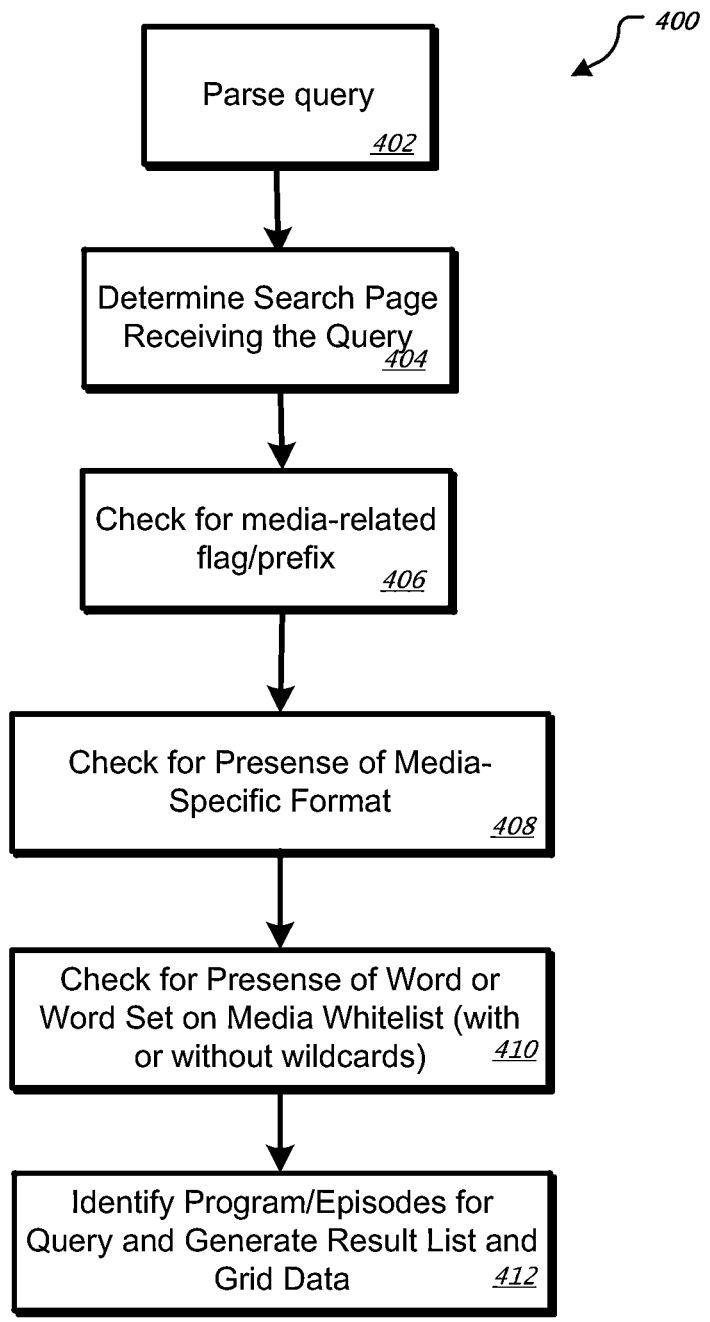
FIG. 4 is a flow chart of a process for identifying media requests in user queries.

FIG. 4 is a flow chart of a process 400 for identifying media requests in user queries. In general, the process makes a number of checks on a submitted query to infer whether the request is media related. Some of the checks may be determinant, in that they may immediately trigger a decision that the search is media-related; others may not be determinant, in that they may be used only as one of multiple factors, to infer whether the query is media related or not.

At box 402, the process 400 begins by the system parsing a received query. The parsing may occur, for example, by breaking the query at each word or at each group of words, such as each pair of words, or tuple. For example, if the query is "The Tonight Show", word groups of "the tonight" and "tonight show" may be formed by the system. In this example, however, the system may initially remove common words such as articles, so that the only word group is "tonight show." Also, generally, the parsing may ignore capitalization, as shown for this example, but capitalization of a query may be taken into account when generating a score or other indicator of whether the query is media related. In particular, actor names and program names are generally capitalized, so that capitalization in a query may provide an indication that the query is media related—at least in comparison to a possible category of information that would not normally involve capitalization.

At box 404, the system determines the identity of a search page that received the query. In particular, if the search was received at a general page such as is shown in FIG. 1A, it is generally not possible to conclude, without analysis of the query, that the query is media-related. On the other hand, if the query is provided on a media-related page, such as that shown in FIG. 1C, the system may be configured to assume, at least initially, that the query is media-related. That assumption may be overcome, however, if a check of the query or words or word groups in the query does not turn up any matches in a media-related database.

At box 406, the system determines whether the query includes or is accompanied by some form of media-related flag, like a prefix. Generally such a flag will be inserted by a user intentionally to force the generation of media-related results, where the user knows that such forcing will occur because of instructions the user has received about the system's operation. For example, a user may know that they can force a media-related result by preceding a query with "tv", tv:", "movie", "movie:", or another prefix. This is similar to the manner in which a user has been able to force certain results in other areas, such as forcing a dictionary definition result by preceding a query with "definition" or "definition:". Where such a forcing occurs, the remaining boxes may be skipped except for the last box (box 412) in FIG. 4.

At box 408, the system may check for the existence of a media-specific format in the query. The format may be partially or wholly independent of the particular value of the portion of the query being considered. For example, if the system determines that information following a "time" format such as x:xx, xx:xx, x oclock, xpm, xam, x p.m., and x a.m., among others, is in a query, the system may determine that the query is related to time-based information, and may identify one or more corpuses of information, including media results, that are associated with time-based parameters. This may occur whether the query is for 8:02, 12:54, or any other time value. Other examples of media-related formats can include specification of days of the week, e.g., "Star Trek Wednesday," or dates, e.g., "Star Trek Aug. 23, 2003," or other references to time periods, e.g., "Star Trek prime time" or "Star Trek tomorrow," etc.

Genres may also be identifiable by the system 300 and parsed appropriately to return appropriate media-related results. For example, a user may enter a search terms such as "comedy," or "genre:comedy," or, using a particular show or movie title, "comedy:blazing saddles," and receive only shows that match the queried genre. The identifier "comedy" can be used to match a list of genres or media-related information to match appropriate results. In one embodiment, a UI element, such as a user-selectable drop-down box may allow the user to explicitly select a genre for which to perform the search. For example, a user may select "drama" from a dropdown list of genre choices when searching for "silence of the lambs."

At box 410, the system checks word or word sets in the query for a match in a media whitelist. Such a whitelist may be a list of terms that have been determined to be media related. For example, general media-related terms may be included in the whitelist. Examples include movie, show, play, broadcast, live, repeat, comedy, sitcom, drama, and other such terms. The whitelist (or a different list in a group of related whitelists) may include specific media-related terms such as tonight show, cheers, ted danson, tom selleck, magnum, bruckheimer, spelling, and other such words or word groups.

Where the system is configured to parse queries in a particular manner, the terms in the whitelist may be stored in a similar manner to the way in which the queries will be parsed (or vice-versa), to permit for more accurate matching. For example, if the system parses only to tuples, the whitelist can also be formed up to and including tuples. Where a candidate term for the whitelist is longer than a tuple, it can be split into two or more tuples for storage in the whitelist. Whitelist matching can also be performed using a finite state automata to efficiently check against potentially extensive whitelists of terms or groups of terms.

Every word and word group may be checked against the whitelist in certain implementations. If multiple words or word groups match the whitelist, such multiple matches may further indicate that a query is media related. Thus, for example, if a query generates multiple matches on media-related whitelists, but only one match on a whitelist for another topic, the query may be more likely to be inferred as a media-related search than a search related to the other topic. Again, such a determination may be determinative of the system's decision or may only be a factor among several factors.

In some implementations, an information provider maintains a similar "blacklist" of queries that are likely to falsely trigger display or promotion of media-related results. For example, an information provider can statistically analyze received queries to identify specific queries that trigger the display or promotion of corresponding media-related results that are later determined to be not relevant to the original query. (E.g., in some implementations, the information provider can determine that certain results are not relevant by analyzing user interactions with the results after the results are provided to the user's device. In particular, user selection of links related to search results can indicate that the results are relevant; results that are ignored by the user can be deemed to be not relevant. Over time, and by analyzing a large number of similarly queries, an information provider can, in some implementations, determine that media-related information is or is not generally relevant to specific queries). Where a term in a query is determined to trigger such false positives, it may be placed on a media-related blacklist so that its presence in a query prevents the query from being considered media-related. For example, the query "plasma tv" may contain the trigger term "tv," but having the blacklisted term "plasma" would indicate that this query is not actually as media-related as the term "tv" alone would indicate (i.e., since the user is probably interested in information of plasma TVs (such as for purchase) as opposed to what is actually on TV).

Terms in a whitelist or blacklist may include wild cards and root expanders. For example, a term like CSI* may appear in a whitelist to indicate that any word or word group that begins with CSI will generate a hit—so as to cover the various variants of the CSI franchise on television. Such use of wild cards may permit for quicker and more efficient checking of queries against the lists, and may also provide a convenient mechanism by which to identify a class of instances that ought to generate a whitelist hit.

Although the various actions in this figure have been shown in a linear grouping as one example, the particular determinations made in the process and the order of those determinations may vary depending on the implementation. Also, as noted, certain determinations may end the inquiry and skip the process to the identification, selection, and formatting of information for response to the query. Other determinations may simply be used as factors in a larger determination of whether a query suggests any particular type of result, and what that result is.

At box 412, the system has determined, with a sufficient degree of certainty, that the query is media-related. As a result, it may specifically query various media-related corpuses of information, and may format the information for display in a particular manner, such as in the one box in FIG. 1A, the groupings and grid of FIG. 1B, or the various modules of a details page in FIG. 1C. As one example, the query may be analyzed to determine the media-related portion of the query, and that portion may be used to obtain certain information such as general web search results. In other parts of the process, such information may be used along with other information in the query to retrieve data for display to the user. For example, a time and date may be extracted from the query along with a name of a program, and those parameters may be used to locate all episodes of the program around the identified time, e.g., to permit construction of a program guide grid like that shown in FIG. 1B.

Certain portions of the query may also be used in a manner other than literal matching. For example, where a time is identified in a query (e.g., 8 pm, 8:00-10:00, prime time, late night, etc.), the provided time may be converted into a range restrictor or similar parameter for retrieving relevant information. For example, the time may be used to identify a particular episode of a series identified in a query. In a like manner, a term that matches a rating may be passed as a restrictor on search results, such that a user may be presented only with movies rated PG because the user's query included the term "pg."

Figure 5:
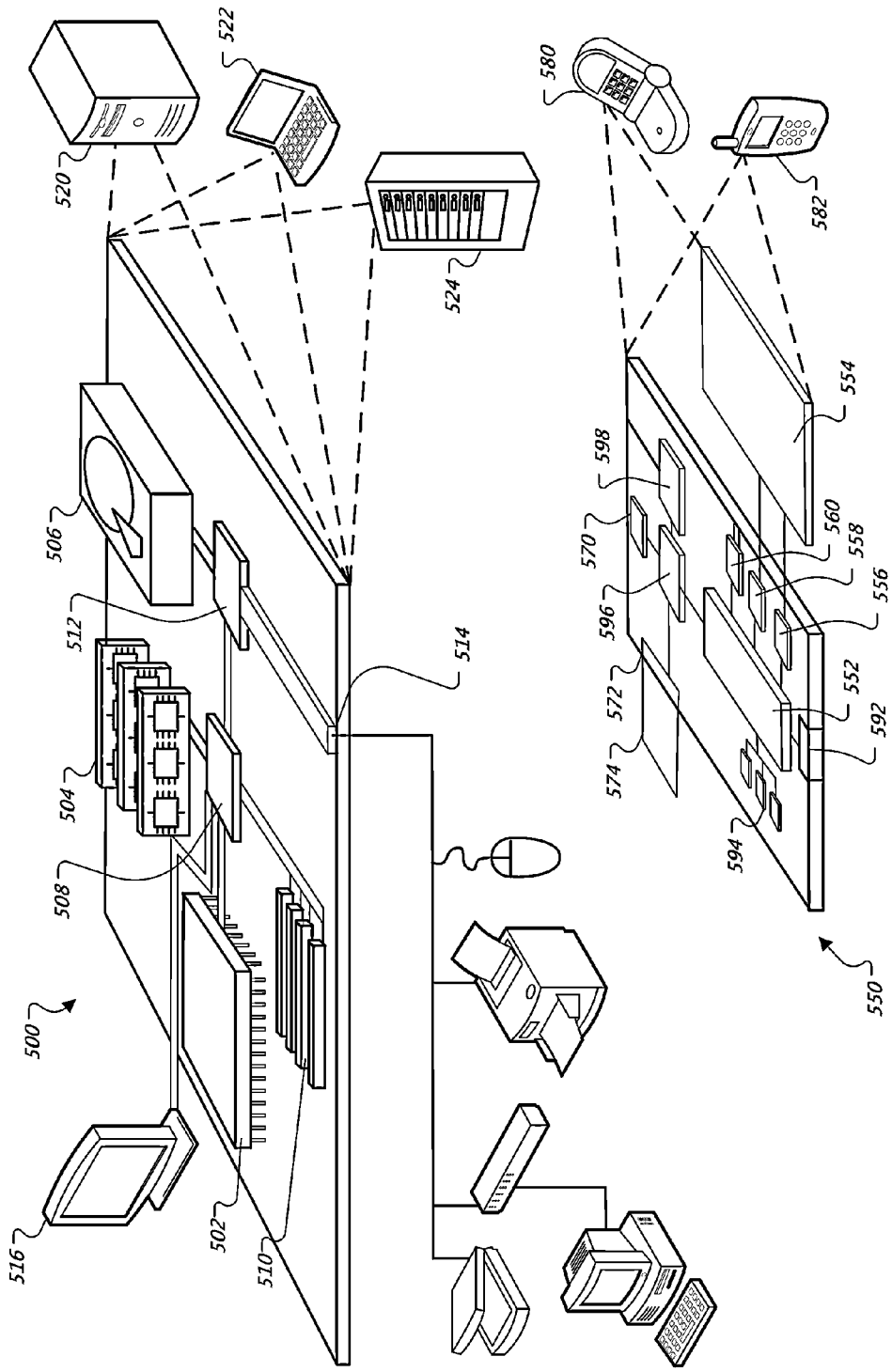
FIG. 5 shows an example of a computer device and a mobile computer device that can be used to implement the techniques described here.

FIG. 5 shows an example of a computer device 500 and a mobile computer device 550 that can be used to implement the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, various forms of the flows shown above may be used, with steps re-ordered, added, or removed. Also, although several applications of the media identification systems and methods have been described, it should be recognized that numerous other applications are contemplated. Moreover, although many of the embodiments have been described in relation to identifying media content, that term should be understood to include various forms of content, such as on-line video (e.g., YouTube), television, movies, radio, podcasts, etc. Accordingly, other embodiments are within the scope of the following claims.

What is claimed is:

1. A computer-implemented method, comprising:
receiving a first query at a central information provider from a first client device over a network, identifying whether the first query includes one or more media-related terms, and in response to determining that the first query does not include one or more media-related terms, providing search results responsive to the first query in a format that includes a list of one or more uniform resource locator links;
receiving a second query over the network;
identifying one or more media-related terms in the second query that indicate the second query relates to one or more media-related objects;
identifying one or more time-based terms in the second query;
responding to the identification of the one or more media-related terms by:
  translating the time-based terms from a general time description to a time range; and
  providing media-specific results in response to the second query, wherein the format of the media-specific results provided in response to the second query is different than the format of the search results provided in response to the first query, and the media-specific results comprise:
  (a) a list of one or more program episodes that are responsive to the second query and that occur during the time range, the one or more program episodes in the list being grouped according to a program title and one or more broadcast date and time;
  (b) a schedule grid that displays a plurality of programs on a plurality of different channels for a time period including at least the time range, and wherein the plurality of programs include one or more of the program episodes responsive to the second query,
wherein the schedule grid is defined by a time axis and a channel axis and includes one or more indicators near particular ones of the plurality of programs that are provided in both the list and the schedule grid, the one or more indicators being used to signify that the particular ones of the plurality of programs match search criteria used to generate the list, and wherein the list and the schedule grid are to be displayed simultaneously next to each other.

2. The method of claim 1, wherein identifying media-related terms in the query comprises comparing words or word sets from the query to one or more whitelists or blacklists of media-related terms.

3. The method of claim 1, wherein identifying media-related terms in the query comprises submitting words or word sets from the query to a machine learning system that has been trained using information known to be media related.

4. The method of claim 3, wherein identifying media-related terms in the query comprises determining a distance between one or more terms in the query and one or more terms in the machine learning system.

5. The method of claim 1, wherein the list includes a plurality of groupings of the program episodes, and wherein the program episodes are grouped by programs of the program episodes.

6. The method of claim 1, further comprising obtaining information for the media-specific search results from a third-party structured database of media content, and from a non-media-directed database.

7. The method of claim 6, wherein obtaining the information from the non-media-directed database includes modifying the query by adding a term descriptive of media and querying the non-media-directed database with the modified query to limit the information from the non-media-directed database to media-related results.

8. A computer system comprising:
a processor;
a storage device coupled to the processor and storing instructions, that when executed by the processor, cause the processor to perform operations comprising:
receiving a first query at a central information provider from a first client device over a network, identifying whether the first query includes one or more media-related terms, and in response to determining that the first query does not include one or more media-related terms, providing search results responsive to the first query in a format that includes a list of one or more uniform resource locator links;
receiving a second query over the network;
identifying one or more media-related terms in the second query that indicate the second query relates to one or more media-related objects;
identifying one or more time-based terms in the second query;
responding to the identification of the one or more media-related terms by:
translating the time-based terms from a general time description to a time range; and
receiving from a search engine media-specific results that are responsive to the second query;
formatting the received media-specific results for display, wherein the format of the media-specific results provided in response to the second query is different than the format of the search results provided in response to the first query, and the media-specific results comprise:
(a) a list of one or more program episodes that are responsive to the second query and that occur during the time range, the one or more program episodes in the list being grouped according to a program title and one or more broadcast date and time; and
(b) a schedule grid that displays a plurality of programs on a plurality of different channels for a time period including at least the time range, and wherein the plurality of programs include one or more of the program episodes responsive to the second query, wherein the schedule grid is defined by a time axis and a channel axis and includes one or more indicators near particular ones of the plurality of programs that are provided in both the list and the schedule grid, the one or more indicators being used to signify that the particular ones of the plurality of programs match search criteria used to generate the list, and wherein the list and the schedule grid are to be displayed simultaneously next to each other; and
generating code for the display of the formatted results.

9. The system of claim 8, wherein identifying media-related terms in the query comprises comparing words or word sets from the query to one or more whitelists or blacklists of media-related terms.

10. The system of claim 8, wherein identifying media-related terms in the query comprises submitting words or word sets from the query to a machine learning system that has been trained using information known to be media related.

11. The system of claim 10, wherein identifying media-related terms in the query comprises determining a distance between one or more terms in the query and one or more terms in the machine learning system.

12. The system of claim 8, wherein the list includes a plurality of groupings of the program episodes, and wherein the program episodes are grouped by programs of the program episodes.

13. The system of claim 8, further comprising obtaining information for the media-specific search results from a third-party structured database of media content, and from a non-media-directed database.

14. The system of claim 13, wherein obtaining the information from the non-media-directed database includes modifying the query by adding a term descriptive of media and submitting the modified query to the search engine to query the non-media-directed database with the modified query to limit the information from the non-media-directed database to media-related results.

15. A computer-readable storage device encoded with a computer program product, the computer program product including instructions that, when executed, perform operations comprising:
receiving a first query at a central information provider from a first client device over a network, identifying whether the first query includes one or more media-related terms, and in response to determining that the first query does not include one or more media-related terms, providing search results responsive to the first query in a format that includes a list of one or more uniform resource locator links;
receiving a second query over the network;
identifying one or more media-related terms in the second query that indicate the second query relates to one or more media-related objects;
identifying one or more time-based terms in the second query;
responding to the identification of the one or more media-related terms by:
translating the time-based terms from a general time description to a time range; and
receiving from a search engine media-specific results that are responsive to the second query;

formatting the received media-specific results for display, wherein the format of the media-specific results provided in response to the second query is different than the format of the search results provided in response to the first query, and the media-specific results comprise:
(a) a list of one or more program episodes that are responsive to the second query and that occur during the time range, the one or more program episodes in the list being grouped according to a program title and one or more broadcast date and time; and
(b) a schedule grid that displays a plurality of programs on a plurality of different channels for a time period including at least the time range, and wherein the plurality of programs include one or more of the program episodes responsive to the second query, wherein the schedule grid is defined by a time axis and a channel axis and includes one or more indicators near particular ones of the plurality of programs that are provided in both the list and the schedule grid, the one or more indicators being used to signify that the particular ones of the plurality of programs match search criteria used to generate the list, and wherein the list and the schedule grid are to be displayed simultaneously next to each other; and
generating code for the display of the formatted results.

16. The computer-readable storage device of claim 15, wherein identifying media-related terms in the query comprises comparing words or word sets from the query to one or more whitelists or blacklists of media-related terms.

17. The computer-readable storage device of claim 15, wherein identifying media-related terms in the query comprises submitting words or word sets from the query to a machine learning system that has been trained using information known to be media related.

18. The computer-readable storage device of claim 17, wherein identifying media-related terms in the query comprises determining a distance between one or more terms in the query and one or more terms in the machine learning system.

19. The computer-readable storage device of claim 15, wherein the list includes a plurality of groupings of the program episodes, and wherein the program episodes are grouped by programs of the program episodes.

20. The computer-readable storage device of claim 15, the operations further comprising:
obtaining information for the media-specific search results from a third-party structured database of media content, and from a non-media-directed database, and
wherein obtaining the information from the non-media-directed database includes modifying the query by adding a term descriptive of media and submitting the modified query to the search engine to query the non-media-directed database with the modified query to limit the information from the non-media-directed database to media-related results.

21. The method of claim 1, wherein providing media-specific results in response to the query further comprises presenting one or more programs or episodes for a particular channel in a column having a time division closest to an actual time that the one or more programs or episodes are presented in a virtual channel.

22. The method of claim 1, wherein the format of the media-specific results further comprises including one or more of a program title, a program time of airing, or a viewing channel within the media-specific results.

23. The method of claim 1, wherein providing media-specific results in response to the query does not include providing a Uniform Resource Locator as part of the search results.

24. The method of claim 1, further comprising determining that the received query is not media-specific and affixing a media-specific prefix to the received query.

* * * * *